Sept. 20, 1966  S. B. McFARLIN  3,273,545
METHOD AND APPARATUS FOR SEPARATING FLUIDS
Filed Oct. 13, 1964
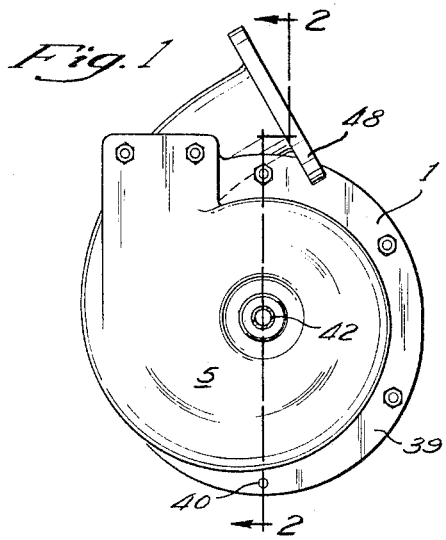
Fig. 1
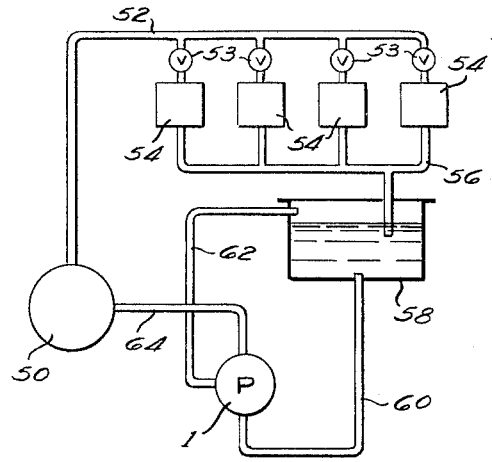
Fig. 3
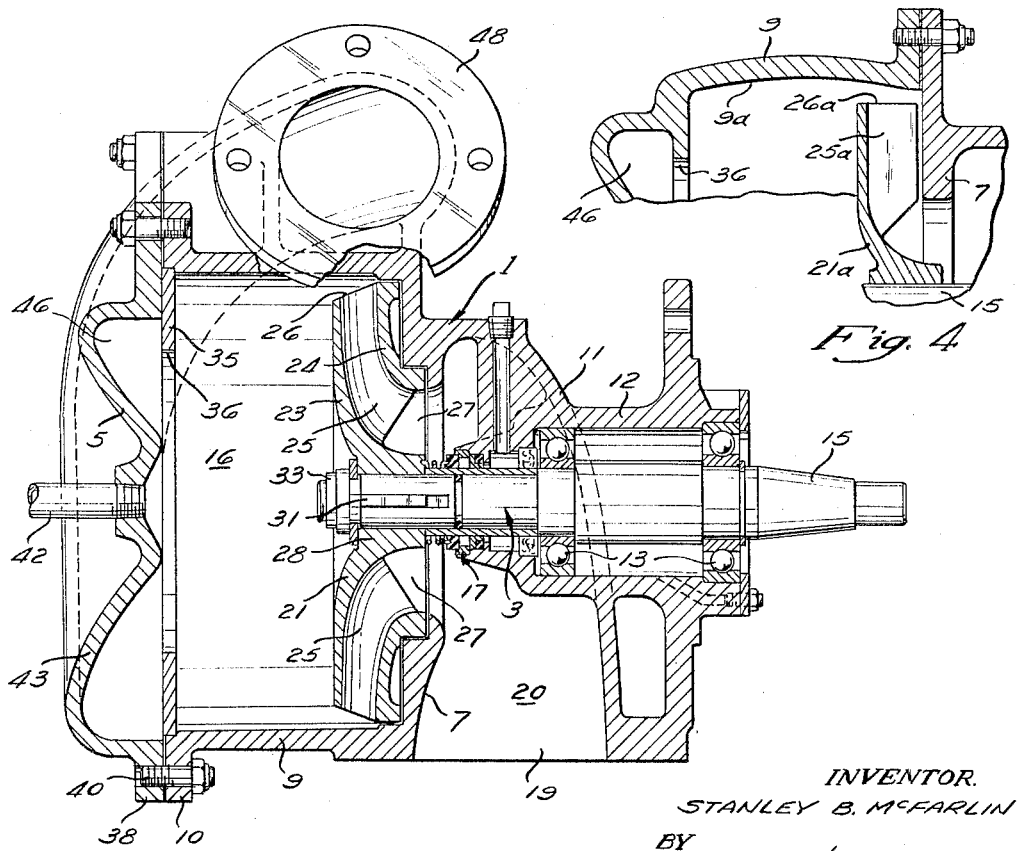
Fig. 4
Fig. 2
INVENTOR.
STANLEY B. McFARLIN
BY WATTS & FISHER
B D Watts
ATTORNEYS

United States Patent Office 3,273,545
Patented Sept. 20, 1966

3,273,545
METHOD AND APPARATUS FOR
SEPARATING FLUIDS
Stanley B. McFarlin, Jeromesville, Ohio, assignor to
The Gorman-Rupp Company
Filed Oct. 13, 1964, Ser. No. 403,620
17 Claims. (Cl. 123—41.47)

This invention relates to the centrifugal pump art and is partly concerned with a method of and a centrifugal pump for continuously pumping and separating a mixture of liquid and gas and is also partly concerned with a liquid cooling system for an internal combustion engine in which such a pump is an important part.

There are numerous instances where it is desirable to pump and separate a mixture of fluids of different specific gravities. One such instance is a multiple radiator filled with cooling liquid at certain times and with air at other times while the other radiators are filled with cooling liquid at all times. Conventional self-priming centrifugal pumps are capable of separating air from water while the pump is being primed but, so fas as I know, are incapable of continuously pumping and separating a mixture of gas and liquid and separately discharging the separated fluids from the pump. Accordingly, one object of this invention is to devise a centrifugal pump which will separate a mixture of fluids of different specific gravities and discharge them separately.

Other instances where such a pump can be used advantageously are, for example, the separation of gas from brewers' mush, and the separation of air entrained in milk which has been subjected to the centrifugal separating process. In general, the present invention may be applied to a wide variety of gaseous mixtures and liquid mixtures.

The present apparatus invention aims to provide a centrifugal pump which will satisfy the above stated needs and attains that aim by a new combination and arrangement of parts and a new mode of operation.

The present system invention aims to provide a cooling system in which the cooling liquid is freed of entrained gas before the liquid enters the cooling system and attains that aim by including a pump embodying the present apparatus invention as an important part of the system.

This invention will be better understood by those skilled in the art from the following specification and the accompanying drawings in which:

FIG. 1 is a front elevation of a preferred form of the present invention;

FIG. 2 is a vertical sectional view taken on line 2—2 of FIG. 1;

FIG. 3 shows schematically a system including the pump of FIGS. 1 and 2; and,

FIG. 4 is a fragmentary sectional view of a modified form of impeller and casing.

A preferred form of pump embodying the present apparatus invention is shown in some detail in FIGS. 1 and 2. That pump comprises a casing designated generally at 1 equipped with an impeller unit designated generally at 3, and a cover 5.

The casing 1 includes a back wall 7, an elongated cylindrical wall 9 extending forwardly therefrom and open at its front end and a flange 10 at the open end and a projection 11 extending rearwardly from the back wall 7 and including a housing 12 for bearings 13 for impeller shaft 15. Walls 7 and 9 partly define a pumping and separating chamber 16. Conventional sealing means, designated generally at 17, serve to prevent escape of fluids out of the casing about the shaft. Casing 1 has an opening 19 in its bottom wall through which a mixture of fluids to be separated may enter inlet chamber 20 to the rear of back wall 7.

The impeller unit 3 includes shaft 15 and impeller 21 which is mounted on the forward end of said shaft and is disposed in chamber 16 adjacent to the rear wall 7 of the casing. The impeller shown in FIG. 2 is of the double shroud type, that is, it has front and rear shrouds 23 and 24, respectively, and curved vanes 25 connecting those shrouds and forming fluid passages from the annular eye 27 which surrounds the hub 28 of the impeller and communicates with the inlet chamber 20 in the housing. The periphery of the impeller is inclined at an acute included angle to the shaft as indicated at 26, so that fluids discharged from the impeller will be directed circumferentially against, and longitudinally along, the inner surface of the cylinder 9 toward its front end.

A key 31 seated in keyways in shaft 15 and hub 28 serves to prevent relative rotation of the shaft and impeller and nut 33 serves to retain the impeller on the shaft.

At the front end of the cylindrical part 9 of casing 1 and remote from the impeller 21 is positioned a baffle in the form of ring 35 which is provided with a central opening 36. This ring 35 bears against a shoulder at the front end of cylindrical wall 9 and is retained in place by cover 5. This cover has a flange 38 which is secured to flange 10 of casing 1 by stud bolts or cap screws 40 which pass through the flanges. Cover 5 is provided with a central outlet in the form of pipe 42 substantially in axial alignment with the shaft 15 for the discharge of gases which are separated from other fluids or liquids in chamber 16 of casing 1.

Cover 5 is of dished configuration between flange 38 and outlet pipe 42. This dished portion 43 partially defines an annular chamber 46 which surrounds the central outlet 42 and which communicates with the outlet through fitting 48 to which a discharge pipe (not shown) may be connected.

FIG. 4 shows a modified form of the impeller and casing. The impeller 21a differs from that of FIG. 2 in that it has no rear shroud and the rear edges of the vanes 25a lie close to the inner surface of end wall 7 of the casing. The periphery 26a of the impeller 21a is substantially coaxial with the inner surface of wall 9 and shaft 15.

It will be understood that the annular side wall 9 is preferably cylindrical to minimize its cost but that it may depart from a cylindrical shape, for example, as is indicated at 9a in FIG. 4.

While the ring 35 is shown as being clamped between the end wall 7 and cover 5, the cover may be made integral with the side wall in which case the rear wall should be made separate from wall 9, as is indicated in FIG. 4.

The forward end of the casing has means defining an outlet. This means is ring-like and may be integral with, or separable from but secured to, the side wall. In either event the means which defines this annular outlet may be called a baffle.

The axial length of the chamber 16 may vary widely depending partly on the pumping capacity of the pump and partly on the difference in specific gravity of the fluids to be separated, the chamber being longer with the larger volume of mixed fluids being pumped and with the smaller differences in specific gravity. The diameter of the outlet, i.e., the opening in the baffle, may vary widely from a maximum where the minimum centrifugal force at the inner surface of the mixed fluids is sufficient to result in separation of the fluids, that is, where the difference in their specific gravities is great, to a minimum where the separated fluids tend to become reentrained.

The operation of the pump just described is substantially as follows.

With the parts assembled as shown in FIGS. 1 and 2 and the inlet opening 19 connected to a source of fluids to be separated and the impeller being rotated by shaft 15, the mixed fluids will be drawn into the eye 27 of the impeller and will be discharged at the periphery of the impeller into chamber 16 so as to flow circumferentially and longitudinally along the surface of the cylindrical wall 9, and completely fill the radial space in chamber 16 which lies between the surface of wall 9 and the inner periphery of ring 35, in other words, until the fluid of the greater gravity can flow through the opening 36 in ring 35. As the fluid flows circumferentially in chamber 16 it is subjected to centrifugal force according to the formula $V^2/r$, where V is the annular velocity and $r$ is the radius. As the fluid fills the space between the wall 9 and the opening 36, its annular velocity remains substantially constant but its radius is decreased. As a result the centrifugal force is increased progressively from the wall 9 to the inner surface of the fluid. Since the fluid which flows through opening 36 is traveling at a high annular velocity, it continues that flow in volute 46 and travels therealong to the outlet in fitting 48. In this manner fluids of different specific gravities can be separated, that is, when one of the fluids is a gas and the other is a liquid or both are gases or both are liquids.

One form of the present system invention is diagrammatically shown in FIG. 3 which illustrates a cooling system for an internal combustion engine. In FIG. 3 the cooling liquid jacket 50 of an internal combustion engine is connected to a header 52 through which liquid may pass through valves 53 to one or more of the radiators 54 of the engine, as desired, manipulation of the valves 53 selectively controlling the entry of fluid into each of these radiators.

A header 56 connected to each of the radiators 54 serves to receive fluid passing out of the radiators and to conduct it to tank 58. A conduit 60 serves to conduct fluids from tank 58 to inlet 19 of the pump of FIG. 2. Gas entrapped in the liquid in tank 58 will be separated in chamber 16 of the pump and conducted thence through conduit 62 to tank 58 above the liquid therein. The liquid, substantially free from gas, is returned to the jacket 50 of the engine through pipe line 64.

The operation of the cooling system of FIG. 3 is substantially as follows.

At various times while the engine is in operation, adequate cooling is afforded by less than the full number of radiators. At such times the radiators which are not needed for cooling may be deactivated, that is, valves controlling the inlet of liquid from header 52 to some of the radiators may be closed. At such times the deactivated radiators fill up with gas. When it is necessary to reactivate the deactivated radiators, liquid is admitted by opening the valves from header 52 but the incoming liquid entraps gas in the radiators and the mixture is discharged into tank 58. Unless the entrapped gas is removed from the liquid before it enters the jacket 50 of the engine, the gas will form bubbles on the surfaces of the walls of the engine cylinders within the jacket and will impede the flow of heat from the cylinders to the liquid thereby reducing its cooling effect. The present system invention, including particularly the present apparatus, overcomes those disadvantages and insures that substantially all the gas entrapped in liquid withdrawn from tank 58 will be separated from the liquid before it reenters the jacket of the engine.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A cooling system comprising a liquid cooling jacket of an internal combustion engine, a plurality of radiators, means for conducting liquid from said jacket selectively to said radiators including a header connected to said jacket, separate branch tubes leading from the header to the radiators and valves in said branch tubes to control the flow of liquid from the header to the radiators, a tank connected to the radiators to receive liquid and gas discharged therefrom, a centrifugal pump positioned to receive a mixture of liquid and gas from said tank and to pump and separate them, and means to conduct the separated liquid into said jacket.

2. The combination of elements set forth in claim 1 in which the pump includes a casing having a pumping chamber and a separating chamber, the means to pump said mixture includes an impeller rotatable in said pumping chamber and the means to separate the gas and liquid of the mixture includes baffle means near one end of said separating chamber and having a restricted opening therethrough and a closure for said end and disposed adjacent to said baffle means, said closure partly defining an annular flow path for liquid passing through the opening in said baffle means and having a gas outlet substantially coaxial with the impeller.

3. A centrifugal pump for pumping a mixture of fluids of different gravities and separating those fluids comprising a casing having a substantially horizontal axis, an annular side wall, a rear wall at one end of the side wall and having an inlet, outlet defining means at the other end of the annular wall, an impeller within said side wall and near said rear wall and shaft means to rotate said impeller, the outlet in said means being substantially coaxial with the impeller and small enough in diameter for the centrifugal force imposed on the mixed fluids in the separating chamber to cause the fluid of lower specific gravity to separate from the fluid of higher specific gravity, and being large enough to insure the flow of fluid of higher specific gravity out of the separating chamber substantially free from reentrained fluid of lower specific gravity.

4. The combination of elements set forth in claim 3 in which the said side wall is of sufficient length to permit fluids of different specific gravities to separate in the separating chamber before passing through said outlet.

5. The combination of elements set forth in claim 3 in which there is a front wall at the front of said outlet defining means, said front wall defining a central tubular flow passage for the fluid of the lower specific gravity and partly defining an annular flow passage therearound for the fluid of the higher specific gravity.

6. A centrifugal pump for pumping a mixture of fluids of different specific gravities and separating those fluids comprising a casing having a substantially horizontal axis, an annular side wall, a rear wall at one end of the side wall and having an inlet, and a baffle wall near the other end of the annular wall having a central outlet, an impeller within said side wall and adjacent to one of said end walls and having an inlet on one side and its outer periphery adjacent to the inner surface of the side wall, said side and rear walls and baffle partly defining a substantially horizontal chamber coaxial with the impeller, and a closure at the end of the side wall adjacent to the baffle, said closure having an outlet substantially coaxial with said impeller for discharge of fluid of the lower specific gravity from the said chamber, said closure partly defining an annular chamber around said central outlet and a discharge passage for flow of the fluid of greater specific gravity passing through said central outlet in the baffle.

7. The combination of elements set forth in claim 6 in which the side wall is elongated and partly defines a pumping chamber in which the impeller is positioned and a separating chamber having a greater volume than that of the pumping chamber.

8. The combination of elements set forth in claim 6 in which the baffle wall is a ring and the closure is a cover secured to the casing and positioning the ring thereagainst.

9. The combination of elements set forth in claim 6 in which the closure constitutes a cover for the discharge end of the casing, is disc shaped in its central portion around said central outlet and is shaped to form an annular flow path therearound for fluid passing through the outlet in the ring.

10. The combination of elements set forth in claim 6 in which the baffle is a ring having substantial radial length and a restricted opening therethrough, the radial length of said ring being great enough to insure that fluids of the lighter specific gravity will escape from the fluid of higher specific gravity in the casing due to the centrifugal force applied to the mixed fluids, and of small enough radial length to insure that the fluid of higher specific gravity passing through the ring will be substantially free from reentrained fluids of the lower specific gravity.

11. A centrifugal pump for pumping a mixture of fluids of different specific gravities and separating those fluids comprising a casing having an annular side wall, a rear end wall, a front end wall and a baffle adjacent to said front end wall, an impeller within said side wall near said rear end wall to direct the mixed fluids from the impeller circumferentially along said side wall and longitudinally therealong toward said front end wall, said baffle having an opening therethrough smaller in diameter than that of the side wall, said front end wall having a central outlet for the fluid of lighter specific gravity and partly defining an annular passage for the fluids of greater specific gravity flowing through said baffle.

12. The combination of elements set forth in claim 11 in which the periphery of the impeller is inclined at an acute angle to the axis of rotation of the impeller.

13. The combination of elements set forth in claim 11 in which the side wall is substantially cylindrical and its axial length is several times that of the impeller.

14. The combination of elements set forth in claim 11 in which the inner surface of the annular side wall is arcuate and its axial length is several times that of the impeller.

15. The combination of elements set forth in claim 11 in which the said front wall is detachably connected to the annular side wall and the impeller has a fluid inlet in its rear side.

16. The combination of elements set forth in claim 11 in which the front wall is integral with the annular side wall and the rear side wall is detachably connected to the annular side wall and is provided with an inlet for fluid to enter the rear side of the impeller.

17. The method of continuously pumping a mixture of fluid of different specific gravities and separating them which comprises the steps of subjecting the mixed fluids to centrifugal force and causing the mixture to flow circumferentially in, and longitudinally through a substantially horizontal chamber having an end wall provided with a central outlet, restraining the longitudinal flow of said mixture in the chamber while increasing the radial depth of the mixture and thereby increasing the centrifugal force applied to the mixture and causing the fluid of lower specific gravity to separate from the fluid of higher specific gravity, separately discharging from the chamber through said outlet the fluid of lower specific gravity substantially free of the higher specific gravity fluid, and the fluid of higher specific gravity substantially free from the fluid of the lower specific gravity.

References Cited by the Examiner

UNITED STATES PATENTS

| | | | |
|---|---|---|---|
| 1,143,957 | 6/1915 | Hansen | 103—113 |
| 1,623,804 | 4/1927 | Muir | 123—41.21 |
| 1,643,510 | 9/1927 | Muir | 123—41.08 |
| 2,216,542 | 10/1940 | Paige | 103—113 |
| 2,278,397 | 3/1942 | Scheibe | 103—113 |
| 2,288,514 | 6/1942 | Caroselli | 123—41.21 |
| 2,841,127 | 7/1958 | Baster | 123—41.27 X |
| 3,162,182 | 12/1964 | Gratzmuller | 123—41.08 |
| 3,203,354 | 8/1965 | Pedersen | 103—113 |

FOREIGN PATENTS

| | | |
|---|---|---|
| 1,290,705 | 3/1962 | France. |
| 630,932 | 6/1936 | Germany. |

KARL J. ALBRECHT, *Primary Examiner.*